(12) United States Patent
Shindo et al.

(10) Patent No.: US 8,685,226 B2
(45) Date of Patent: *Apr. 1, 2014

(54) METHOD OF RECOVERING VALUABLE METAL FROM SCRAP CONTAINING CONDUCTIVE OXIDE

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 731 days.

This patent is subject to a terminal disclaimer.

(21) Appl. No.: 12/525,450

(22) PCT Filed: Mar. 7, 2008

(86) PCT No.: PCT/JP2008/054130
§ 371 (c)(1), (2), (4) Date: Jul. 31, 2009

(87) PCT Pub. No.: WO2008/117649
PCT Pub. Date: Oct. 2, 2008

(65) Prior Publication Data
US 2010/0072075 A1    Mar. 25, 2010

(30) Foreign Application Priority Data
Mar. 27, 2007 (JP) .................................. 2007-081603
Jun. 27, 2007 (WO) .................. PCT/JP2007/062902

(51) Int. Cl.
*B25F 1/04* (2006.01)
(52) U.S. Cl.
USPC ........... 205/704; 205/705; 205/710; 205/711; 205/719
(58) Field of Classification Search
USPC .................................................. 205/560–614
See application file for complete search history.

(56) References Cited

U.S. PATENT DOCUMENTS

| | | | | |
|---|---|---|---|---|
| 2,915,444 A | * | 12/1959 | Meyer | ............................. 205/711 |
| 4,330,377 A | * | 5/1982 | Franks, Jr. | ..................... 205/496 |
| 5,290,412 A | | 3/1994 | Saito et al. | |
| 5,417,816 A | | 5/1995 | Nakashima et al. | |
| 5,849,221 A | * | 12/1998 | Yukinobu et al. | .......... 252/519.3 |
| 6,896,788 B2 | | 5/2005 | Shindo et al. | |
| 7,435,325 B2 | | 10/2008 | Shindo et al. | |
| 8,003,065 B2 | | 8/2011 | Shindo et al. | |
| 8,007,652 B2 | | 8/2011 | Shindo et al. | |
| 8,012,335 B2 | | 9/2011 | Shindo et al. | |
| 8,012,336 B2 | | 9/2011 | Shindo et al. | |
| 8,012,337 B2 | | 9/2011 | Shindo et al. | |
| 8,308,934 B2 | * | 11/2012 | Shindo et al. | ................. 205/564 |
| 2009/0004498 A1 | | 1/2009 | Shindo et al. | |
| 2010/0072075 A1 | | 3/2010 | Shindo et al. | |
| 2010/0084279 A1 | | 4/2010 | Shindo et al. | |
| 2010/0084281 A1 | | 4/2010 | Shindo et al. | |
| 2010/0101963 A1 | | 4/2010 | Shindo et al. | |
| 2010/0101964 A1 | | 4/2010 | Shindo et al. | |
| 2010/0282615 A1 | | 11/2010 | Shindo et al. | |
| 2010/0288645 A1 | | 11/2010 | Shindo et al. | |
| 2010/0288646 A1 | | 11/2010 | Shindo et al. | |

FOREIGN PATENT DOCUMENTS

| | | |
|---|---|---|
| JP | 07-145432 A | 6/1995 |
| JP | 2003-247089 A | 9/2003 |
| JP | 2005-314786 A | 11/2005 |

OTHER PUBLICATIONS

One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.
One page English language Abstract of JP 63-274725 A, Nov. 11, 1988.

\* cited by examiner

*Primary Examiner* — Arun S Phasge
(74) *Attorney, Agent, or Firm* — Howson & Howson LLP

(57) ABSTRACT

Provided is a method of recovering valuable metal from oxide system scrap including the steps of performing electrolysis using an insoluble electrode as an anode and an oxide system scrap as a cathode, and recovering the scrap of the cathode as metal or suboxide. Specifically, this method enables the efficient recovery of valuable metal from oxide system scrap of an indium-tin oxide (ITO) sputtering target or oxide system scrap such as mill ends that arise during the production of such a sputtering target.

12 Claims, No Drawings

METHOD OF RECOVERING VALUABLE METAL FROM SCRAP CONTAINING CONDUCTIVE OXIDE

BACKGROUND OF THE INVENTION

The present invention relates to a method of recovering valuable metal from scrap containing conductive oxide as represented by an ITO scrap of a spent indium-tin oxide (ITO) sputtering target or an ITO scrap such as ITO mill ends (hereinafter collectively referred to as "scrap containing conductive oxide" in this specification). Incidentally, the phrase "recovery of valuable metal" as used herein shall include the recovery of metals having valuable metal as its component, as well as solutions, alloys, hydroxides, oxides, suboxides and peroxides containing such metals.

In recent years, an indium-tin oxide ($In_2O_3$—$SnO_2$: generally known as ITO) sputtering target is being widely used in numerous electronic components; for instance, for a transparent conductive thin film of an LCD device or a gas sensor. In many cases, however, it is used as a result of a thin film being formed on a substrate or the like by employing the sputtering method as the thin film forming means. ITO is a representative oxide with conductive property.

Oxide with conductive property (conductive oxide) is not limited to ITO, and there are numerous conductive oxides including IGZO (In—Ga—Zn—O composite oxide), ZnO, Zn—$SnO_2$, and $SnO_2$, and the like. These composite oxides are similarly used for preparing a target, sputtering the target to form a thin film, and thereby used in various electronic components.

It is true that the sputtering method as the thin film forming means is superior, but when a sputtering target is used to form a transparent conductive thin film or the like, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions, that is, unused portions of the target, and all of these conductive oxides become scrap. Moreover, even during the production of a sputtering target, scraps (mill ends) will arise from abrasive powder, cutting powder and the like.

Since expensive materials are used as the conductive oxide sputtering target material, the process of recovering raw materials from scrap materials is being generally performed. As this kind of metal recovery method, conventionally, a method that combines wet refining such as the acid solution process, ion exchange method, and solvent extraction method has been used.

For instance, in the case of an ITO scrap, there is a method of subjecting such ITO scrap to cleansing and pulverization, thereafter dissolving this in hydrochloric acid, precipitating and eliminating impurities such as zinc, tin, lead and copper as sulfide by passing hydrogen sulfide through the solution, thereafter adding ammonia to neutralize the solution, and recovering the resulting indium hydroxide.

For instance, in the case of an ITO scrap, there is a method of subjecting such ITO scrap to cleansing and pulverization, thereafter dissolving this in hydrochloric acid, precipitating and eliminating impurities such as zinc, tin, lead and copper as sulfide by passing hydrogen sulfide through the solution, thereafter adding ammonia to neutralize the solution, and recovering the resulting indium hydroxide.

Nevertheless, the indium hydroxide obtained with the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the ITO target cannot be stably maintained upon subsequently manufacturing such ITO target. The same applies to other conductive oxides.

Conventional technology and its advantages and disadvantages are described below taking ITO as the representative example.

As one example of such conventional technology, there is an etching method of a transparent conductive film including the steps of reducing an ITO film deposited on a substrate based on an electrochemical reaction in the electrolyte, and dissolving the reduced transparent conductive film in the electrolyte (refer to Patent Document 1). However, the object of this method is to obtain a mask pattern with high precision, and relates to technology that is different from the recovery method.

There is also technology of separating, in the electrolyte, the impurities contained in an In brazing filler material used in the bonding with the backing plate as pretreatment for recovering valuable metal from ITO (refer to Patent Document 2). Nevertheless, this method does not relate to technology of directly recovering valuable metal from ITO.

Moreover, upon recovering indium from an intermediate obtained as a by-product of the zinc refining process or an ITO scrap, disclosed is technology of separating tin as halogenated stannate, performing reduction treatment with hydrochloric acid or a nitric acid solution, subsequently adjusting the pH of this aqueous solution to 2 to 5, reducing metallic ions of iron, zinc, copper, thallium and the like in order to obtain a substance that will not precipitate easily, and separating the indium component in the aqueous solution (refer to Patent Document 3). With this technology, however, there is a problem in that the refining process is complicated, and a superior refining effect cannot be expected.

Further, as a method of recovering high purity indium, disclosed is technology of dissolving ITO in hydrochloric acid, adding alkali thereto to make the pH 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution after the elimination to obtain indium hydroxide, filtering the obtained indium hydroxide, obtaining indium sulfate from the filtered indium hydroxide, and obtaining indium by electrowinning the indium sulfate (refer to Patent Document 5). Although this is an effective method with a significant refining effect, there is a drawback in that the process is complicated.

Also proposed is a method of recovering indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter recovering indium (refer to Patent Document 6). Although this is also an effective method with a significant refining effect, there is a drawback in that the process is complicated.

Additionally disclosed is a method of recovering metallic indium including the steps of extracting suboxide-containing cast scrap floating on molten metal indium and introducing this into an atmosphere furnace, vacuating the furnace once, thereafter introducing argon gas, heating the furnace to a prescribed temperature and reducing the suboxide-containing cast scrap (refer to Patent Document 7).

Although this is in itself an effective method, there is a drawback in that this is not a fundamental recovery method of conductive oxide scrap.

In light of the above, a method that is efficient and has a versatile recovery process is being sought.

[Patent Document 1] Japanese Patent Laid-Open Publication No. S62-290900
[Patent Document 2] Japanese Patent Laid-Open Publication No. H8-41560
[Patent Document 3] Japanese Patent Laid-Open Publication No. H3-82720
[Patent Document 4] Japanese Patent Laid-Open Publication No. 2000-169991
[Patent Document 5] Japanese Patent Laid-Open Publication No. 2002-69684
[Patent Document 6] Japanese Patent Laid-Open Publication No. 2002-69544
[Patent Document 7] Japanese Patent Laid-Open Publication No. 2002-241865

SUMMARY OF THE INVENTION

In order to overcome the foregoing problems, the present invention provides a method of efficiently recovering valuable metal from scrap containing conductive oxide or scrap such as mill ends arose in the manufacture of such sputtering target.

The present invention provides a method of recovering valuable metal from an ITO scrap by performing electrolysis using an insoluble electrode as the anode, using a scrap containing conductive oxide as the cathode, and reducing the scrap of the cathode to metal or suboxide. The phrase "recovery of valuable metal" as used herein shall include metals having valuable metal as its component, as well as solutions, alloys, hydroxides, oxides, suboxides and peroxides containing such metals.

Generally, since scrap of ITO and the like is an oxide system ceramic, under normal conditions, it would not be possible to envisage recovering valuable metal with the electrolytic method. Nevertheless, ITO itself to be recovered in the present invention possesses conductive property even though it is an oxide system ceramic. The present invention focused attention on this point and attempted to recover valuable metal (for instance, in the case of ITO, indium or tin and the compound thereof) with electrolysis, and succeeded.

This is a significant feature of the present invention. Conventionally, it was common practice to use metal scraps, which are the raw material to be recovered, as the anode, and there is no technology that offered the kind of reverse thinking as in the present invention. Nor is there any document that suggests this kind of method. There is no example either that utilizes the hydrogen gas generated from the cathode.

Thus, the method of recovering valuable metal from scrap containing conductive oxide according to the present invention is a basic invention.

It is well known that ITO and other substances possess conductive property. This is considered to be a result of the oxygen defect of the oxide as the sintered compact. The present invention utilizes the conductive property of the oxide itself. Nevertheless, it should be understood that the knowledge and judgment that the recovery of valuable metal by electrolysis utilizing the conductive property inherent to oxides could only be realized through the execution of numerous experiments.

With a conventional method of recovering valuable metal from scrap containing conductive oxide such as ITO, a plurality of processing steps are combined such as pulverizing the scrap and dissolving it in strong acid, and then subjecting it to reduction, substitution, sulfurization, precipitation, neutralization, filtration, solvent extraction, ion exchange, casting and so on.

The problem during the foregoing processing steps is the inclusion of impurities during the pulverization process of the scrap containing conductive oxide, and, since it will be necessary to eliminate the impurities mixed in during the pulverization process at the subsequent processing steps, the overall process will become more complicated.

Thus, it should be easy to understand that being able to directly recover valuable metal from scrap containing conductive oxide by electrolysis yields a highly significant advantage.

The present invention provides a method of recovering valuable metal from scrap containing conductive oxide in which hydrogen generated in the cathode during the electrolysis is used to reduce the scrap containing conductive oxide to metal or suboxide, and a method of recovering valuable metal from scrap containing conductive oxide in which the metal or suboxide created on the cathode is dissolved with acid and recovered as a solution.

The present invention additionally provides a method of recovering valuable metal from scrap containing conductive oxide in which the metal or suboxide created on the cathode is dissolved with acid and electrowinning is performed to the solution after the elimination to recover valuable metal, a method of recovering valuable metal from scrap containing conductive oxide in which the scrap is recovered as hydroxide from the recovered metal or suboxide solution, and a method of recovering valuable metal from scrap containing conductive oxide in which a solution of a plurality of recovered metals is subject to electrolysis, and the scrap is recovered as an alloy.

The present invention further provides a method of recovering valuable metal from scrap containing conductive oxide in which hydroxide or suboxide or a mixture thereof is roasted, and the scrap is recovered as oxide or a compound oxide or an oxide mixture.

Upon recovering valuable metal from scrap containing conductive oxide, electrolysis may be performed by adjusting the pH of electrolyte to an acidic region, and reduce the scrap containing conductive oxide of the cathode to metal. With the metal solution recovered above, a part of its constituent metal (low-value metal) may be eliminated with the replacement method, solvent extraction or the like, and such solution may be further subject to electrowinning in order to recover valuable metal.

With the metal solution recovered as described above, pH of this solution may be adjusted to a region where hydroxide of the respective metals can be obtained, and then recover hydroxide or a mixture of two or more types of hydroxides. The hydroxide or a mixture of two or more types of hydroxides may be recovered as oxide or a mixture of two or more types of oxides by further roasting.

As described above, the recovery of valuable metal from scrap containing conductive oxide according to the present invention enables to maintain the purity without change if the scrap containing conductive oxide to be subject to electrolysis is in itself scrap of a high purity material, and the scrap can be recovered as metals having high purity valuable metal as its component, a solution containing such metals, high purity alloy, high purity hydroxide or a mixture of two or more types of hydroxides, or high purity oxide or suboxide or a mixture thereof.

It is obvious that this is a significant advantage of the present invention. The present invention yields superior effects of saving complicated processes and the process of eliminating impurities mixed in during production as in the past, enabling to improve the production efficiency and recover high purity valuable metal.

The electrolytic condition such as the current density and the like is not uniformly decided since the subject is scrap such as mill ends, and the current density is suitably selected and implemented according to the amount of mill ends and the quality of material. The liquid temperature of the electrolyte solution is generally set to a range of 0 to 100° C., but room temperature (15 to 30° C.) will suffice.

The method provided by the present invention is superior, since recovering valuable metal from oxide system scrap, such scraps as an oxide sputtering target or a scrap as mill ends that arise during the production of such a sputtering target is simply subject to electrolysis with an insoluble electrode as an anode and the oxide system scrap as a cathode, it is very easy to efficiently recover valuable metal as metals, a solution containing such metals, alloy, hydroxide or a mixture of two or more types of hydroxides, or oxide or suboxide or a mixture thereof. As long as it can be reduced with the hydrogen gas generated from the aqueous solution, all oxide system scraps may be used.

Moreover, the recovery of valuable metal from oxide system scrap according to the present invention enables to recover the foregoing materials while maintaining the purity of the scrap itself to be subject to electrolysis as is. This is a significant advantage of the present invention. The present invention yields superior effects of saving complicated processes and the process of eliminating impurities mixed in during production as in the past, being able to increase the production efficiency, and recover high purity valuable metal.

DETAILED DESCRIPTION OF THE INVENTION

By way of electrolysis, the present invention is capable of efficiently recovering oxide system scrap containing valuable metal, easily as metals, a solution containing such metals, alloy, hydroxide or a mixture of two or more types of hydroxides. Moreover, by roasting the obtained hydroxide or a mixture of two or more types of hydroxides, it is possible to efficiently recover oxide or a mixture of two or more types of oxides.

The roasting temperature is set to 100 to 1000° C., preferably 100 to 500° C. Moisture will remain if the roasting temperature is less than 100° C. and sintering will occur if the roasting temperature is higher than 1000° C. Thus, the roasting temperature is set to be within the foregoing range. Nevertheless, it is evident that the roasting temperature may be set outside of the foregoing range, depending on the material. The foregoing range is proposed as a rough indication of the roasting condition.

As the electrolyte, a solution of sodium sulfate, sodium chloride, sodium nitrate, ammonium sulfate, ammonium chloride, ammonium nitrate, potassium chloride, potassium nitrate, potassium sulfate and the like may be arbitrarily selected and used as described above. Incidentally, caution is necessary in the processing since ammonia gas will be generated if the cation is an ammonia cation, and since there will a nitrogen load in the discharge treatment. Moreover, caution is necessary in the processing since chlorine gas will be generated if the anion is a chlorine anion, and since nitric oxide gas will be generated if the anion is a nitric acid anion and there will a nitrogen load of the discharged water.

Since a sulfuric acid system hardly entails the foregoing problems, it could be said that a sulfuric acid solution would be a suitable material. Nevertheless, there is no reason that other electrolytes cannot be used as long as the foregoing problems can be overcome.

In addition, it is also possible to use a publicly-known additive agent in order to improve the current efficiency. As described above, if two or more types of recycled oxides can be simultaneously recovered and they are close to a recycled product, it should be easily understood that the recycle efficiency will improve.

A special electrolytic apparatus is not required. For instance, it would suffice to perform electrolysis upon using an oxide system scrap that can be easily reduced with hydrogen gas as the cathode, and using an insoluble electrode of carbon or noble metal as the anode. It is thereby possible to avoid the increase or inclusion of impurities initially contained in the scrap.

It is also desirable to perform electrolysis by adjusting the pH of the electrolyte to be 7 or less. This is a preferable condition for reduction, and based on the intention of generating hydrogen gas from the cathode and using such hydrogen gas to reduce oxide to metal. Incidentally, the foregoing preferred pH is merely an example, and it should be easily understood that such pH may be changed according to the different types of scrap material.

It is desirable to adjust the electrolytic condition as needed according to the type of raw material. The only factor to be adjusted in this case is the production efficiency. Generally, better productivity can be attained through electrolysis with a large current and high voltage. Nevertheless, there is no need to limit the conditions to the foregoing conditions, and such conditions may be arbitrarily selected.

Further, although there is no particular limitation on the electrolysis temperature, it is desirable to perform electrolysis upon adjusting to 0 to 100° C. Electrolysis can be sufficiently performed at room temperature. Scraps such as mill ends may be respectively placed in a cathode box (basket) for the electrolysis. If a scrap itself is of a prescribed size (size that can be used as an electrode), it can be used as an electrode plate as is.

When the anode formed from the insoluble electrode or the cathode formed from two or more types of hydroxides scrap is energized and electrolysis is commenced, oxygen gas will be generated in the anode. However, the generation of oxygen gas will not cause any particular problem.

Meanwhile, hydrogen gas is generated together with the commencement of energization in the cathode of the scrap that can be easily reduced with hydrogen gas, and the scrap is subject to hydrogen reduction and becomes metal (in the case of an ITO scrap, it will become $ITO+H_2 \rightarrow In-Sn$ metal). The generation of hydrogen is caused by the electrolysis of water $(H_2O \rightarrow \frac{1}{2}H_2 + OH^-)$.

Nevertheless, if the energization takes time, slightly thick metal (in the cast of an ITO scrap, this would be In, Sn) is formed on the surface of the cathode of the scrap, and sponge-formed metal suboxide will merely be formed below the metal surface layer, and the reduction will not progress any further. In this case, it would be desirable to discontinue the electrolysis, dissolve the created metal and suboxide of such metal with acid, and expose the new surface containing the oxide. Consequently, a newly created face will appear and the reduction will continue to progress.

From the recovered metal solution, partial low value metals (in the case of an ITO scrap, this would be tin) are eliminated with the neutralization method, replacement method, metastannic acid method, hydrolysis method or the like, and electrowinning is further performing the solution after the tin is eliminated in order to recover more expensive metals (in the case of an ITO scrap, this would be indium). In the case of ITO, with the neutralization method, the metal is neutralized in an alkali solution of sodium hydroxide, potassium hydroxide, ammonia or the like, and tin is eliminated at pH of 0.5 to 3. In addition, for instance, tin may also be eliminated by way of substitution with an indium sponge, adding nitric acid and being eliminated as metastannic acid, air bubbling, and using an oxidizing agent such as hydrogen peroxide and being eliminated, for instance, as $Sn(OH)_4$.

With the metal solution recovered as described above, pH of this solution may be adjusted to be in a range of 3 to 11 in order to recover the scrap as hydroxide or a mixture of two or more types of hydroxides. The recovered hydroxide may further be roasted at 100 to 1000° C. in order to recover the scrap as oxide.

The oxide obtained thereby may be used as is as the raw material of the product. Moreover, as needed, oxide may also be supplemented or added to change the component amount, or add other elements or compounds, and perform sintering to easily obtain a recycled target. The present invention covers all of the foregoing aspects.

Meanwhile, by performing electrolysis to the recovered metal solution, the scrap can also be recovered as an alloy.

In all of the foregoing cases, the precondition is that an insoluble electrode is used as the anode, scrap that can be easily reduced with hydrogen gas is used as the cathode and reduced to metal, and such metal is further dissolved with acid to obtain a metal solution.

From this metal solution, the scrap can be recovered in other required forms such as metal, alloy or two or more types of metals, metal solution, hydroxide, or oxide.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

The amount of 90 g of plate-shaped mill ends (scrap) of ITO (indium oxide-tin oxide) having 20 mm (width)×100 mm (length)× and 6 mm (thickness) was used as the raw material. The components in this raw material were 9.8 wt % of tin oxide ($SnO_2$), and the remainder indium oxide ($In_2O_3$).

The raw material was used as the cathode, and carbon as an insoluble anode was used as the anode. Electrolysis was performed using 1L of electrolyte containing 70 g/L of sodium sulfate, pH of 4.0, electrolysis temperature at 30° C., the voltage at 10V (fixed voltage), the current 2.95 A (start) to 1.2 A (end), and the energization (polarity conversion at a cycle of 5 minutes×12) for a total of 60 minutes (1 hour).

Consequently, In an Sn metals were formed on the surface of the ITO mill ends, and the suboxide in sponge-form was formed internally.

Example 2

The In and Sn metals and suboxide obtained with electrolysis was further subject to acid leaching with sulfuric acid to obtain a solution of indium and tin, this solution was adjusted to pH 2.0 to eliminate tin as tin hydroxide, and indium was further subject to electrowinning under the conditions of electrolysis temperature of 30° C. and current density of 2 $A/dm^2$.

As a result of the foregoing process, it was possible to recover approximately 1.5 g of valuable metal (In) from an ITO scrap.

Example 3

The ITO mill ends of Example 1 were used as the cathode, and Pt was used as the anode. Electrolysis was performed using 100 g/L of sodium nitrate solution, pH of 6.0, and electrolysis temperature of 30° C. The voltage was 10V (fixed voltage), the current was 2.95 A (start) to 1.2 A (end), and the energization time (polarity conversion at a cycle of 5 minutes×12) was a total of 60 minutes (1 hour).

Consequently, as with Example 1, In and Sn metals were formed on the surface of the ITO mill ends, the suboxide in sponge form was formed internally, and it was possible to obtain indium, tin and their suboxides. The total amount of indium and tin obtained from the electrolysis was roughly 1.4 g based on metal conversion.

Example 4

The voltage was fixed at 5V and, with the other conditions being the same as Example 1, electrolysis was performed. The amount of accumulated current was also set the same as Example. Consequently, as with Example 1, In and Sn metals were formed on the surface of the ITO mill ends, the suboxide in sponge-form was formed internally, and it was possible to obtain indium, tin and their suboxides. The total amount of indium and tin obtained from the electrolysis was roughly 2.0 g based on metal conversion.

Example 5

The voltage was fixed at 2V and, with the other conditions being the same as Example 1, electrolysis was performed. The amount of accumulated current was also set the same as Example. Consequently, as with Example 1, In and Sn metals were formed on the surface of the ITO mill ends, the suboxide in sponge-form was formed internally, and it was possible to obtain indium, tin and their suboxides. The total amount of indium and tin obtained from the electrolysis was roughly 2.2 g based on metal conversion.

Example 6

The voltage was fixed at 20V and, with the other conditions being the same as Example 1, electrolysis was performed. The amount of accumulated current was also set the same as Example. Consequently, as with Example 1, In and Sn metals were formed on the surface of the ITO mill ends, the suboxide in sponge-form was formed internally, and it was possible to obtain indium, tin and their suboxides. The total amount of indium and tin obtained from the electrolysis was roughly 1.7 g based on metal conversion.

Example 7

The amount of 10 g of plate-shaped mill ends (scrap) of ITO (indium oxide-tin oxide) having 20 mm (width)×100 mm (length)× and 6 mm (thickness) was used as the raw material. The components in this raw material were 9.8 wt % of tin oxide ($SnO_2$), and the remainder indium oxide ($In_2O_3$).

The raw material was used as the cathode, and Pt was used as the anode. Electrolysis was performed using 1L of electrolyte containing 100 g/L of sodium chloride, pH of 3.0, and electrolysis temperature of 30° C. The voltage was 10V (fixed voltage), and the current was 2.95 A (start) to 1.2 A (end). The amount of accumulated current of electrolysis was 10000 AHr. Consequently, it was possible to obtain indium, tin and their suboxides, and the total amount of indium and tin obtained from the electrolysis was roughly 6.0 kg based on metal conversion. The purity of this mixture was equivalent to Example 1.

Comparative Example 1

The amount of 2 kg of ITO (indium oxide-tin oxide) scrap equivalent to Example 1 was used as the raw material. The components in this raw material were 9.7 wt % of tin oxide ($SnO_2$), and the remainder indium oxide ($In_2O_3$). This raw material was used as the cathode, and insoluble carbon was used as the anode. Electrolysis was performed under the electrolytic condition of pH 12.

Consequently, there was no change in the cathode, and it was not possible to recover indium, tin and their suboxides.

Although each of the foregoing Examples used ITO (indium oxide-tin oxide) mill ends or scraps in which the components thereof were 9.7 wt % of tin oxide ($SnO_2$) and the remainder indium oxide ($In_2O_3$), it is obvious that the electrolytic conditions such as the current density and pH can be arbitrarily changed according to the component amount of $In_2O_3$ and $SnO_2$, and there is no reason to be particularly limited by the component amount of the raw material. In particular, with ITO, the content of tin oxide ($SnO_2$) can be changed from 5 wt % to 30 wt %, and the present invention can also be sufficiently applied to the foregoing cases.

In addition, although there are cases where small amounts of accessory components are added to the ITO, as long as ITO is the basic constituent, it is obvious that the present invention can also be applied to this case.

With the present invention, an insoluble electrode is used as the anode and an ITO scrap is used as the cathode upon performing electrolysis, indium-tin metal is formed on the cathode, this is further dissolved in sulfuric acid, and the scrap can thereby be recovered as indium or tin metal having the valuable metal to be subsequently used as its component, a solution containing such metals, high purity indium-tin alloy, a mixture of high purity indium hydroxide and tin hydroxide or metastannic acid, or a mixture of high purity indium oxide and tin oxide, and it is obvious that valuable metal can be efficiently recovered from the ITO scrap.

Examples other than ITO are now explained.

Example 8

Scrap to be Recovered: IGZO (In—Ga—Zn—O Composite Oxide)

Carbon as the insoluble anode was used as the anode. Using IGZO plate-shaped mill end scraps as the counter electrode, electrolysis was performed using 1L of electrolyte containing 70 g/L of sodium sulfate, pH of 9, and temperature of 20° C. Consequently, hydroxides of In, Ga, and Zn were obtained. The production yield was 98%.

Subsequently, a normally employed wet method (acid leaching→solvent extraction→electrolysis, etc.) was used to recover metals or oxides of In, Ga, and Zn.

As described above, with IGZO (In—Ga—Zn—O composite oxide) having conductive property, it was possible to efficiently recover valuable resources (metal).

Example 9

Scrap to be Recovered: ZnO

Carbon as the insoluble anode was used as the anode. Using ZnO plate-shaped mill end scraps as the counter electrode, electrolysis was performed using electrolyte containing 50 g/L of ammonium sulfate, pH of 10, and temperature of 50° C. Consequently, hydroxide of Zn was obtained. The production yield was 99.5%. The purity was the same as the starting material, or the raw material.

By subjecting this hydroxide once again to desiccation and sintering, it was usable as a ZnO target. As described above, it was possible to efficiently recover ZnO as an oxide with conductive property.

Example 10

Scrap to be Recovered: ZnO—$SnO_2$

Carbon as the insoluble anode was used as the anode. Using ZnO—$SnO_2$ mill end scraps as the counter electrode, electrolysis was performed using electrolyte containing 100 g/L of sodium sulfate, pH of 9, and electrolysis temperature of 70° C.

Consequently, hydroxides of Zn and Sn were obtained. The production yield was 99.0%. As described above, it was possible to efficiently recover ZnO—$SnO_2$ (conductive oxide) as the hydroxides of Zn and Sn.

Example 11

Scrap to be Recovered: $SnO_2$

Carbon as the insoluble anode was used as the anode. $SnO_2$ mill end scraps were used as the counter electrode and subject to electrolysis in a 70 g/L of sodium sulfate solution, pH of 2, and electrolysis temperature of 30° C. Consequently, hydroxide of Sn was obtained. The production yield was 99.7%. As described above, it was possible to efficiently recover $SnO_2$ (conductive oxide) as the hydroxide of Sn.

As shown in Examples 8 to 11 described above, even when using scraps of oxides other than ITO, such scraps can be easily reduced using the hydrogen gas generated in the aqueous solution, and it is thereby possible to efficiently recover valuable metal from oxide system scraps.

The method provided by the present invention is superior, since recovering valuable metal from oxide system scrap, such scraps as an oxide sputtering target or a scrap as mill ends that arise during the production of such a sputtering target is simply subject to electrolysis with an insoluble electrode as an anode and a scrap that can be easily reduced with the hydrogen gas generated in the aqueous solution as a cathode, it is very easy to efficiently recover metals having value metal as its component, a solution containing such metals, alloy of two or more types of metals, hydroxide, oxide, suboxide or a mixture thereof.

Moreover, the recovery of valuable metal from oxide system scrap according to the present invention enables to maintain the purity of the scrap to be subject to electrolysis without change. This is a significant advantage of the present invention. The present invention yields superior effects of saving complicated processes and the process of eliminating impurities mixed in during production as in the past, enabling to increase the production efficiency, and recover high purity valuable metal. Thus, the present invention is highly useful as a method of recovering valuable metal from oxide system scrap.

The invention claimed is:

1. A method of recovering at least one metal from oxide system scrap including the steps of performing electrolysis using an insoluble electrode as an anode and the oxide system scrap as a cathode, and recovering the at least one metal from the oxide system scrap of the cathode as metal or suboxide, wherein the oxide system scrap is reduced to metal or suboxide on the cathode with hydrogen in the cathode during the electrolysis.

2. The method according to claim 1, wherein the metal or suboxide created on the cathode is dissolved with acid and recovered as a solution.

3. The method according to claim 2, wherein the at least one metal is recovered as hydroxide from the recovered metal or suboxide solution.

4. The method according to claim 3, wherein the at least one metal is recovered as an oxide by roasting the hydroxide.

5. The method according to claim 2, wherein the at least one metal is recovered as an alloy by subjecting the solution to electrolysis.

6. The method according to claim 1, wherein the metal or suboxide created on the cathode is dissolved with acid or alkali, a part of the metal configuring a plurality of metals is eliminated from a solution thereof, and electrowinning is performed to the solution after the elimination to recover the at least one metal.

7. The method according to claim 1, further comprising the step of dissolving the metal or suboxide created on the cathode with acid to produce a solution, wherein the at least one metal is recovered as an alloy by subjecting the solution which contains a plurality of metals to electrolysis.

8. The method according to claim 1, wherein the oxide system scrap is ITO and the at least one metal includes In and Sn.

9. The method according to claim 1, wherein the oxide system scrap is an In—Ga—Zn—O composite oxide and the at least one metal includes In, Ga and Zn.

10. The method according to claim 1, wherein the oxide system scrap is ZnO and the at least one metal includes Zn.

11. The method according to claim 1, wherein the oxide system scrap is $ZnO$—$SnO_2$ and the at least one metal includes Zn and Sn.

12. The method according to claim 1, wherein the oxide system scrap is $SnO_2$ and the at least one metal includes Sn.

* * * * *